United States Patent
Schreiner et al.

[19]

[11] Patent Number: 5,983,785
[45] Date of Patent: Nov. 16, 1999

[54] CONTACT TOASTER WITH INFINITE ADJUSTMENT

[75] Inventors: Jason David Schreiner; Gerald W. Sank, both of Palm Harbor, Fla.

[73] Assignee: Merco/Savory, Inc., Fort Wayne, Ind.

[21] Appl. No.: 09/257,149

[22] Filed: Feb. 24, 1999

Related U.S. Application Data

[60] Provisional application No. 60/075,977, Feb. 25, 1998.

[51] Int. Cl.⁶ .................................................. A47J 37/08
[52] U.S. Cl. ............................. 99/386; 99/349; 99/393; 99/423; 99/443 C
[58] Field of Search ........................... 99/326–331, 339, 99/340, 385–393, 399, 443 C, 367, 369, 377–379, 397, 402, 374, 349–351, 423, 427, 443 R; 198/628; 219/492, 497, 521, 386, 400

[56] References Cited

U.S. PATENT DOCUMENTS

| | | | |
|---|---|---|---|
| 1,708,522 | 4/1929 | Prose, Jr. | 99/386 X |
| 2,588,851 | 3/1952 | Kompass | 99/386 |
| 2,847,931 | 8/1958 | Saint | 99/389 |
| 2,917,990 | 12/1959 | Ehrenberg | 99/386 |
| 3,528,361 | 9/1970 | LeVan | 99/386 X |
| 3,587,446 | 6/1971 | Gardner | 99/443 R |
| 3,611,913 | 10/1971 | McGinley | 99/386 X |
| 3,697,725 | 10/1972 | Bielefeldt | 99/443 C |
| 3,739,712 | 6/1973 | Duning | 99/386 X |
| 3,987,718 | 10/1976 | Lang-Ree et al. | 99/423 X |
| 4,189,631 | 2/1980 | Baker | 99/386 |
| 4,261,257 | 4/1981 | Henderson et al. | 99/386 |
| 4,488,480 | 12/1984 | Miller et al. | |
| 4,530,276 | 7/1985 | Miller | |
| 5,673,610 | 10/1997 | Stuck | |

*Primary Examiner*—Timothy Simone
*Attorney, Agent, or Firm*—Ohlandt, Greeley, Ruggiero & Perle

[57] ABSTRACT

A contact toaster has a housing with a product inlet, product outlet and at least one toasting chamber defined in the housing. A heated platen is mounted in the housing and has a platen surface arranged for toasting the food products. A flexible endless belt, which when rotated, is arranged to pass the food products in a toasting path along the platen between the belt and the platen. An infinite controller acts to selectively displace the belt to adjust the distance between the belt and the platen to any value between minimum and maximum distance limits to accommodate food products of different widths. A guide is situated between the belt and the infinite controller so that the controller is in contact with at least one area of the guide. The infinite controller includes a variable distance element with a cam surface which is settable to any selected point of the cam surface between minimum and maximum cam radial limits to move the guide and belt to any belt to a selected platen distance that can have any value equal to or intermediate the maximum and minimum distance limits.

8 Claims, 2 Drawing Sheets

CONTACT TOASTER WITH INFINITE ADJUSTMENT

This application claims the benefit of U.S. Provisional Application Ser. No. 60/075,977, filed Feb. 25, 1998.

FIELD OF THE INVENTION

This invention relates to a food preparation apparatus and in particular to a toaster for toasting food products such as bagels, buns, muffins and the like.

BACKGROUND OF THE INVENTION

Prior art contact toasters are characterized by one or more toasting chambers, each adapted to receive and transport a food product along a heated platen. In U.S. Pat. No. 4,530,276, for example, the toaster employs a rotating endless belt in spaced relation to the platen. Food products are inserted in the space between the belt and the platen and transported in a press fit relationship along the platen surface. To achieve the press fit, a guide plate is situated behind the belt. To accommodate food products of different widths, an adjustable abutment member is typically used to adjust the position of the guide plate and hence the distance between the belt and the platen. The adjustable abutment member is a frame mounted on a rod that is rotatable to four distinct positions (as illustrated in FIG. 6) corresponding to four distinct belt to platen distances or food product widths.

Though adequate for some applications, the utility of the four distinct position adjuster disclosed in U.S. Pat. No. 4,530,276 is limited to food products having a width that is consistent with at least one of the four distinct position adjustments permitted by the abutment member. The problem with this is that it substantially restricts the food products for which the contact toaster may be used.

The present inventors have developed a novel belt platen adjusting mechanism which allows infinite adjustment thereto, thereby allowing the contact toaster to be used for a variety of food products having virtually any reasonable width, e.g., buns made by different manufacturers.

The present invention provides a novel and improved toaster having infinite control between minimum and maximum toaster belt to platen distances.

The toaster embodying the present invention also maintains a selected distance substantially uniformly over the belt area that faces the platen.

SUMMARY OF THE INVENTION

The toaster apparatus embodying the present invention has a housing with a product inlet, product outlet and at least one toasting chamber defined in the housing. A heated platen is mounted in the housing and has a platen surface arranged for toasting the food products. A flexible endless belt, which when rotated, is arranged to pass the food products in a toasting path along the platen between the belt and the platen. An infinite controller acts to selectively displace the belt to adjust the distance between the belt and the platen to any value between minimum and maximum limits to accommodate food products of different widths.

A guide is situated between the belt and the infinite controller so that the controller is in contact with at least one area of the guide at any distance between the limits. The infinite controller includes a variable distance structure which is operable to selectively move the guide and belt to any belt to platen distance value between the maximum and minimum limits.

The variable distance structure also includes in a preferred embodiment a force distributor that widely distributes force over the guide plate surface so as to maintain a substantially uniform belt to platen distance along the toasting path.

BRIEF DESCRIPTION OF THE DRAWINGS

In the drawings, like reference characters denote like elements of structure

DESCRIPTION OF PREFERRED EMBODIMENT

Figure 2:
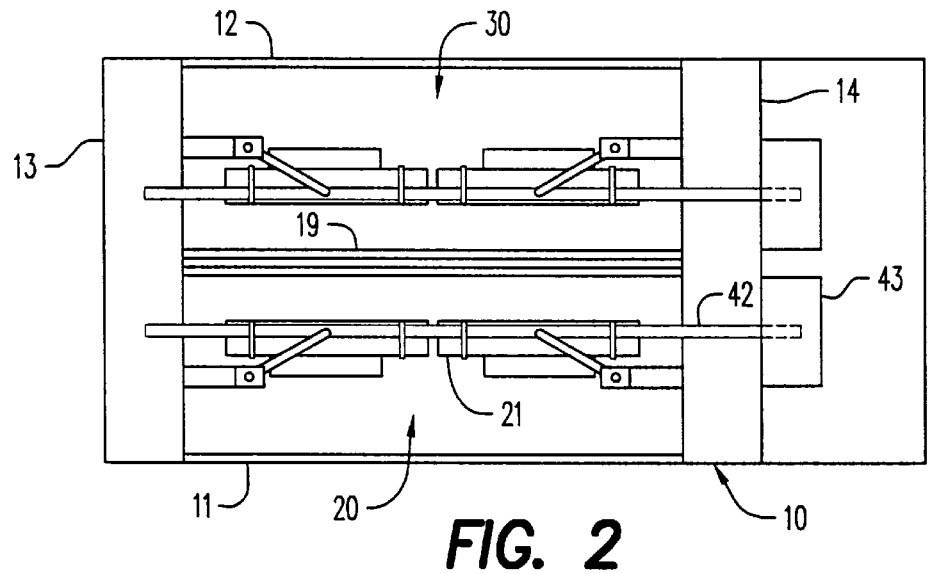
FIG. 2 is a top view of the toaster taken along the line 2—2 of FIG. 1.
Figure 1:
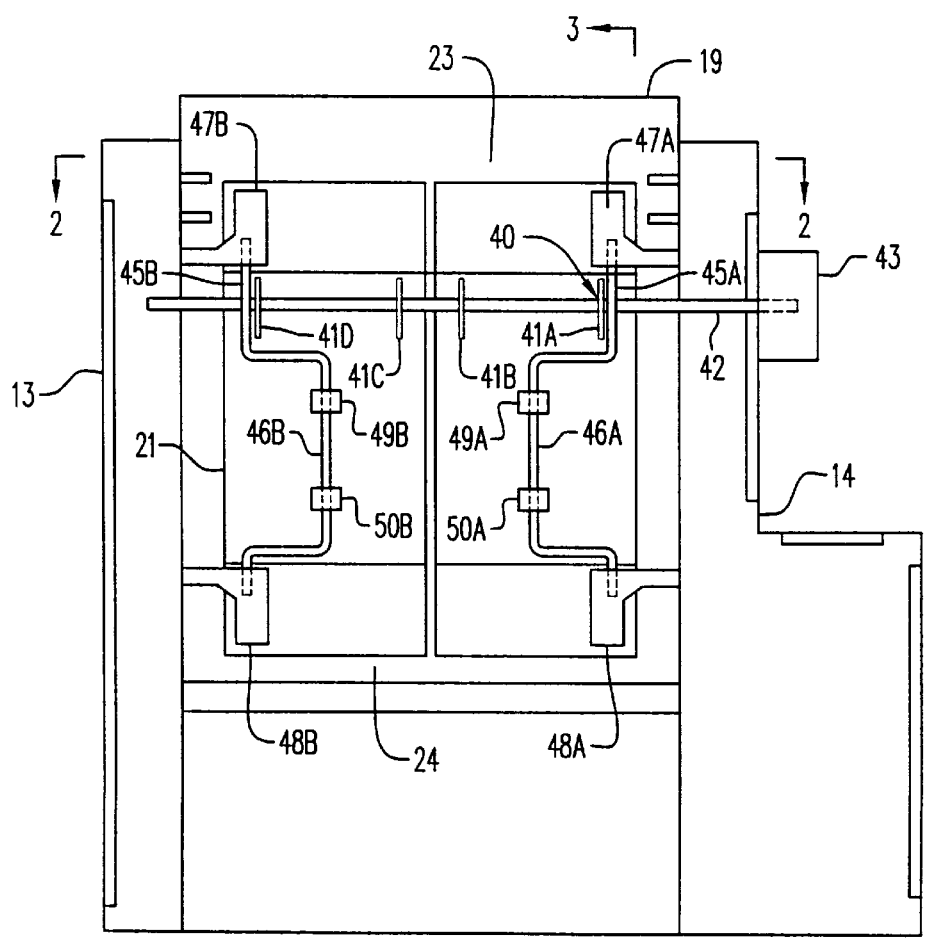
FIG. 1 is an elevation view of a toaster embodying the present invention with the housing partially removed.
Figure 3:
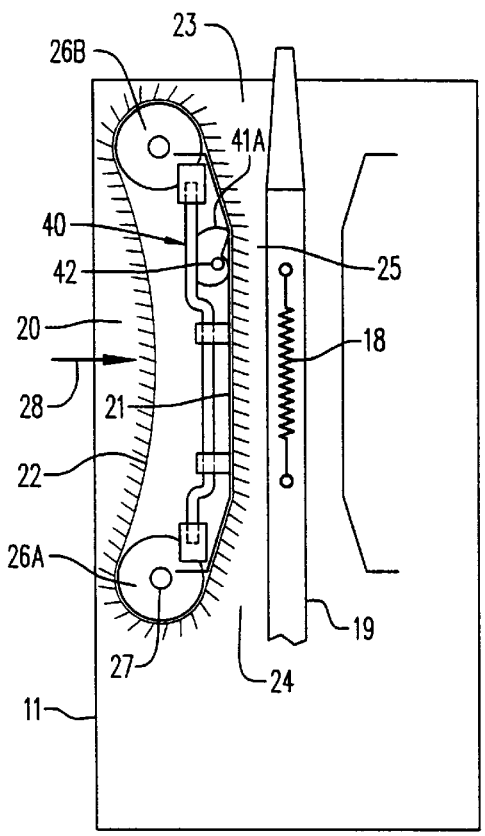
FIG. 3 is a side view of the toaster taken along the line 3—3 of FIG. 1.

The toaster apparatus embodying the present invention is illustrated in FIGS. 1–3. The toaster apparatus has a housing 10 formed of a front panel 11, a back panel 12 and side panels 13 and 14. A heated platen 19 is mounted (by means not shown for clarity purposes) in the housing 10 to define two separate and substantially identical toasting chambers. Because of the substantial identity of the two toasting chambers, only chamber 20 will be described in detail, it being understood that chamber 30 has a set of mirror image parts.

The platen 19 is adapted (by means not shown for clarity purposes) for connection to a standard AC power supply to power a heating element illustrated as a resistor 18 in FIG. 3.

Toasting chamber 20 includes a guide 21 and an endless flexible belt 22 arranged in position with platen 19 to define a food product inlet 23, a food product outlet 24 and a toasting path 25 extending between the inlet and the outlet and between the flexible belt 22 and the platen 19. The flexible belt 22 is mounted in place over driver gear 26A and idle gear 26B. Flexible belt 22 is rotatable by means of a motor (not shown for clarity purposes) coupled to drive shaft 27 of driver gear 26A. Flexible belt 22 is also subjected to a flexing force illustrated by arrow 28 in FIG. 3 (by means not shown for clarity purposes) to control belt tension.

To accommodate food products of varying toasting width sizes, an infinite controller (toasting path width adjuster) 40 is provided to selectively displace the belt 22 to set the distance between the belt and the platen to any value between minimum and maximum distance limits. The toasting path width adjuster includes in the embodiment shown in FIGS. 1–3 a plurality of variable distance elements 41A, 41B, 41C and 41D mounted on a shaft 42, each in contact with a different area of the guide 21.

Figure 7:
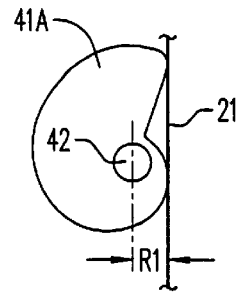
FIG. 7 is an elevation view of the variable distance element of FIGS. 1, 3 and 4 positioned for its minimum radial distance limit.
Figure 8:
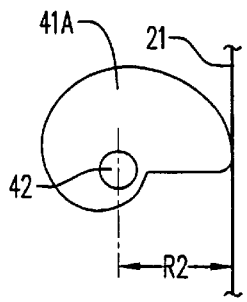
FIG. 8 is an elevation view of the variable distance element of FIGS. 1, 3 and 4 positioned for its maximum radial distance limit.

Each variable distance element is capable of assuming any position between minimum and maximum limits. To this end, each variable distance element 41A–41D is illustrated to have a peripheral cam surface that can assume any radial distance value between minimum and maximum limits. These minimum and maximum limits variable distance element 41A are shown in FIGS. 7 and 8, respectively. In FIG. 7, variable distance element 41A is positioned at the minimum limit, illustrated by radial value R1. In FIG. 8, variable distance element 41A is positioned at the maximum limit, illustrated by radial value R2. The shaft 42 is rotatably manually by means of an adjuster knob 43 (FIG. 1) to position the cam elements 41A–41D to any radial distance value between R1 and R2.

To change the belt to platen distance (toaster path width) the knob 43 is manually rotated to set the cam elements to any value that is intermediate the minimum and maximum values corresponding to any belt to platen distance value that is intermediate maximum and minimum distance values (limits), respectively.

The flexing force imparted to the belt 22 is distributed horizontally across the guide and belt by means of the spacing of the cam elements 41A, 41B, 41C and 41D along the shaft 42 so as to be in contact with separate spaced apart areas of the guide 21.

To further distribute the force imparted to the guide, the variable distance structure includes a force distributor 44 having shafts 45A and 45B arranged in abutting relation to shaft 43 so that as shaft 43 is rotated to a new position, the change in distance between the shaft 43 and the guide 21 is imparted to shafts 45A and 45B. The shaft 45A is positioned on the right side of the guide 21 to distribute force vertically downward. To this end, shaft 45A is rotatably mounted between upper and lower mounts 47A and 48A that are affixed to the housing. Shaft 46A has a bent portion 46A that is affixed to the guide 21 at 49A and 50A. Similarly, the shaft 45B is positioned on the left side of the guide 21 to distribute force vertically downward. To this end, shaft 45B is rotatably mounted between upper and lower mounts 47B and 48B that are affixed to the housing. Shaft 45B has a bent portion 46B that is affixed to the guide 21 at 49B and 50B. This arrangement serves to distribute the flexing force to four additional spaced apart areas of the guide defined by the affixation elements 49A, 49B, 50A and 50B.

Figure 4:
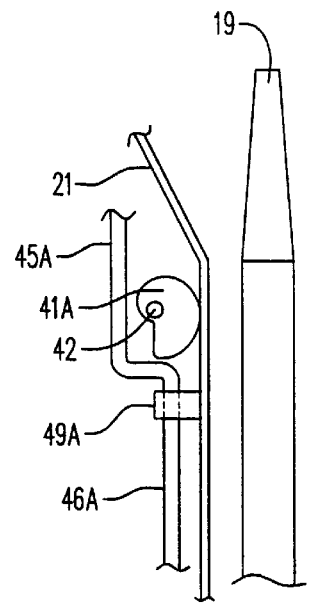
FIG. 4 is a partial side elevation view of the variable distance structure shown in a position intermediate its minimum and maximum limits.

In FIGS. 1–3 the variable distance structure is shown in its minimum limit (radial value R1 in FIG. 7) position which corresponds to the maximum belt to platen distance. FIG. 4 illustrates the variable distance structure at an intermediate limit value. The shaft 42 is now displaced from the guide a distance corresponding to the change in radial value. This causes a like displacement of the force distributor shaft 45A and a rotational displacement of the bent portion 46A.

Figure 5:
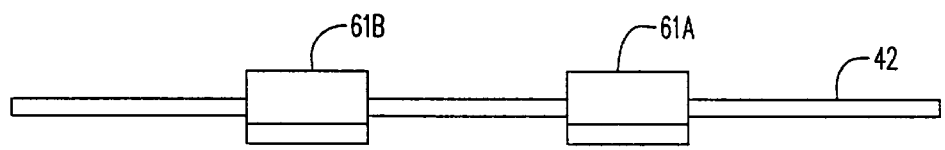
FIG. 5 is a plan view of another embodiment of the variable distance structure according to the present invention.
Figure 6:
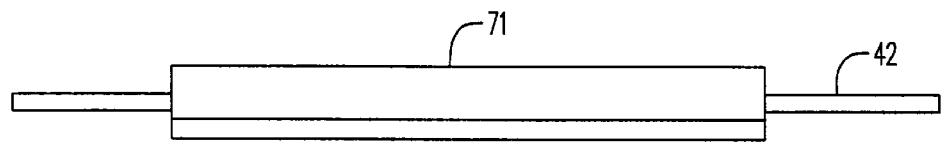
FIG. 6 is a plan view of still another embodiment of the variable distance structure according to the present invention.

With reference now to FIG. 5 there is shown another embodiment of the variable distance structure which employs a plurality of variable distance elements 61A and 61B of larger width than the elements 41A, 41B, 41C or 41D of FIGS. 1–3 and, hence, larger peripheral surface for contact with the guide 21. FIG. 6 shows still another embodiment in which the variable distance element 71 has an even larger width. The side or profile views of the variable distance elements of the FIGS. 5 and 6 are substantially the same as the profile view of variable distance element 41A in FIGS. 3 and 4. The embodiments of FIGS. 5 and 6 preferably employ the force distributor 44 of FIGS. 1–3, though not shown in FIGS. 5 and 6 for clarity reasons.

Modifications can be made to the illustrated embodiment without departing from the spirit of the invention. Accordingly, the preferred embodiment is illustrative only and is not intended to limit the scope of the invention.

What is claimed is:

1. A toaster for toasting food products comprising:

a housing and a product inlet and outlet defined in the housing;

at least one toasting chamber defined in said housing and disposed between said product inlet and outlet;

a platen mounted in said housing having a platen surface arranged for toasting food products in said chamber;

means for conveying said food products through said chamber along said platen including a flexible endless belt and means for rotating said belt to pass food products along a toasting path between said belt and said platen;

means for adjusting the distance between said belt and said platen to any value between predetermined minimum and maximum limits to accommodate food products of different sizes.

2. A toaster in accordance with claim 1 and further comprising:

a guide situated between said belt and said adjusting means so as to be in contact with at least one area of said belt at any distance between said limits; and wherein said means for adjusting said belt comprises a variable distance structure which is operable to selectively move said guide and said belt to any position that yields a belt to platen distance value between said limits.

3. A toaster in accordance with claim 2 wherein said variable distance structure includes at least one variable distance element that is in contact with said one area of said guide.

4. A toaster in accordance with claim 3 wherein said one variable distance element is one of a plurality of variable distance elements, each in contact with a different one of a like plurality of areas of said guide.

5. A toaster in accordance with claim 4 wherein each variable distance element is a cam having a cam surface that is moveable between minimum and maximum cam limits corresponding to the minimum and maximum belt to platen distance limits and selectively settable to any cam surface point between said cam limits and, when so set, said surface point is in contact with the area of said guide that corresponds to said cam.

6. A toaster in accordance with claim 5 wherein said variable distance structure has a variable distance structure shaft that is selectively rotatable to move said cams to any cam surface point between said minimum and maximum cam limits and to distribute force along said shaft among said areas.

7. A toaster in accordance with claim 6 and further comprising;

a force distributor for distributing force from said variable distance shaft to additional areas of said guide to maintain said belt to platen distance substantially uniform along said toasting path.

8. A toaster in accordance with claim 7 wherein said force distributor includes at least one force distributing shaft with portions engaging said additional areas.

\* \* \* \* \*